(12) United States Patent
Peczalski et al.

(10) Patent No.: US 8,264,396 B2
(45) Date of Patent: Sep. 11, 2012

(54) THREE DIMENSIONAL NONCONTACT MOTION SENSOR

(75) Inventors: Andy Peczalski, Eden Prarie, MN (US); Steve D. Huseth, Plymouth, MN (US); George Daniel Hadden, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 292 days.

(21) Appl. No.: 12/690,680

(22) Filed: Jan. 20, 2010

(65) Prior Publication Data

US 2011/0175766 A1 Jul. 21, 2011

(51) Int. Cl.
*G01S 13/62* (2006.01)
(52) U.S. Cl. ........... 342/28; 342/114; 342/118; 342/175
(58) Field of Classification Search .................... 342/28, 342/114, 118, 175
See application file for complete search history.

(56) References Cited

U.S. PATENT DOCUMENTS

| | | | | |
|---|---|---|---|---|
| 2,422,107 A * | 6/1947 | Luck | | 342/434 |
| 3,660,844 A * | 5/1972 | Potter | | 342/20 |
| 3,836,973 A * | 9/1974 | Shnitkin et al. | | 342/362 |
| 3,896,436 A * | 7/1975 | Johnson | | 342/113 |
| 4,054,881 A * | 10/1977 | Raab | | 342/448 |
| 4,145,692 A * | 3/1979 | Armstrong et al. | | 342/173 |
| 4,314,251 A * | 2/1982 | Raab | | 342/463 |
| 4,328,548 A * | 5/1982 | Crow et al. | | 701/518 |
| 4,346,384 A * | 8/1982 | Raab | | 342/451 |
| 4,424,517 A * | 1/1984 | Stern et al. | | 343/771 |
| 4,588,993 A * | 5/1986 | Babij et al. | | 342/351 |
| 4,731,611 A * | 3/1988 | Muller et al. | | 342/28 |
| 4,737,794 A * | 4/1988 | Jones | | 342/448 |
| 4,742,354 A * | 5/1988 | Wen et al. | | 342/188 |
| 4,742,356 A * | 5/1988 | Kuipers | | 342/448 |
| 4,937,582 A * | 6/1990 | Mohuchy | | 342/188 |
| 5,151,701 A * | 9/1992 | Valentine et al. | | 342/20 |
| 5,214,436 A * | 5/1993 | Hannan | | 343/705 |
| 5,307,072 A * | 4/1994 | Jones, Jr. | | 342/147 |
| 5,579,011 A * | 11/1996 | Smrek | | 342/113 |
| 5,942,991 A * | 8/1999 | Gaudreau et al. | | 340/870.16 |
| 6,037,902 A * | 3/2000 | Pinhas et al. | | 343/700 MS |
| 6,049,705 A * | 4/2000 | Xue | | 455/277.1 |
| 6,121,920 A * | 9/2000 | Barrett | | 342/188 |
| 6,195,064 B1* | 2/2001 | Andrews et al. | | 343/797 |
| 6,317,098 B1* | 11/2001 | Andrews et al. | | 343/797 |
| 6,337,653 B1* | 1/2002 | Buchler et al. | | 342/72 |
| 6,861,970 B1* | 3/2005 | Garland | | 342/20 |
| 6,866,643 B2* | 3/2005 | Kramer | | 600/595 |
| 7,136,751 B2* | 11/2006 | Pinto et al. | | 701/470 |
| 8,068,049 B2* | 11/2011 | Salmon et al. | | 342/22 |
| 8,098,161 B2* | 1/2012 | Lavedas | | 340/572.7 |
| 2004/0021461 A1* | 2/2004 | Goldfine et al. | | 324/243 |
| 2004/0212493 A1* | 10/2004 | Stilp | | 340/531 |
| 2004/0212497 A1* | 10/2004 | Stilp | | 340/539.17 |
| 2005/0265124 A1* | 12/2005 | Smith | | 367/128 |
| 2007/0034212 A1* | 2/2007 | Brendley et al. | | 128/897 |
| 2007/0146127 A1* | 6/2007 | Stilp et al. | | 340/531 |
| 2008/0074307 A1* | 3/2008 | Boric-Lubecke et al. | | 342/28 |
| 2008/0136721 A1* | 6/2008 | Parsche et al. | | 343/742 |

(Continued)

*Primary Examiner* — John B Sotomayor
(74) *Attorney, Agent, or Firm* — Schwegman, Lundberg & Woessner, P.A.

(57) ABSTRACT

A non-contact motion sensor comprising a radar detector that includes a first antenna, a second antenna that is orthogonal to the first antenna and a third antenna that is orthogonal to the first antenna and the second antenna. The non-contact motion sensor further includes a control that collects and analyzes signals that are received from the radar detector.

18 Claims, 4 Drawing Sheets

U.S. PATENT DOCUMENTS

| | | | |
|---|---|---|---|
| 2009/0102705 A1* | 4/2009 | Obermeyer | 342/25 F |
| 2009/0303101 A1* | 12/2009 | Wu | 342/28 |
| 2010/0066590 A1* | 3/2010 | Brown et al. | 342/147 |
| 2010/0109873 A1* | 5/2010 | Derose et al. | 340/572.7 |
| 2010/0109938 A1* | 5/2010 | Oswald et al. | 342/90 |
| 2010/0141527 A1* | 6/2010 | Lalezari | 342/368 |
| 2011/0175766 A1* | 7/2011 | Peczalski et al. | 342/28 |
| 2011/0175768 A1* | 7/2011 | Peczalski et al. | 342/118 |

* cited by examiner

THREE DIMENSIONAL NONCONTACT MOTION SENSOR

BACKGROUND

The size, type and location of motions within structures (e.g., operating machinery) may provide an indication as to the relative health of the structure and may be used for predictive maintenance of the structure. One technique for analyzing moving components involves sensing motion (i.e., displacement, vibration and/or acceleration) of one or more of the components on the structures.

Many different types of instruments and systems have been developed for both monitoring and nondestructively testing structures, materials, devices and machines used for manufacturing processes. As examples, nondestructive testing is done on moving parts within machines that are used in refineries, power generators, aircraft, oil platforms, paper mills, and structures (bridges, cranes, etc.) in order to monitor the condition of those items.

Sensors have also been used for quality control in manufacturing operations and in research applications involving moving composite structures (e.g., those machines as fiberglass, reinforced plastics and advanced aerospace materials). In addition, sensors have been used as an effective indirect method for monitoring tool condition in machining operations.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

Figure 1A:
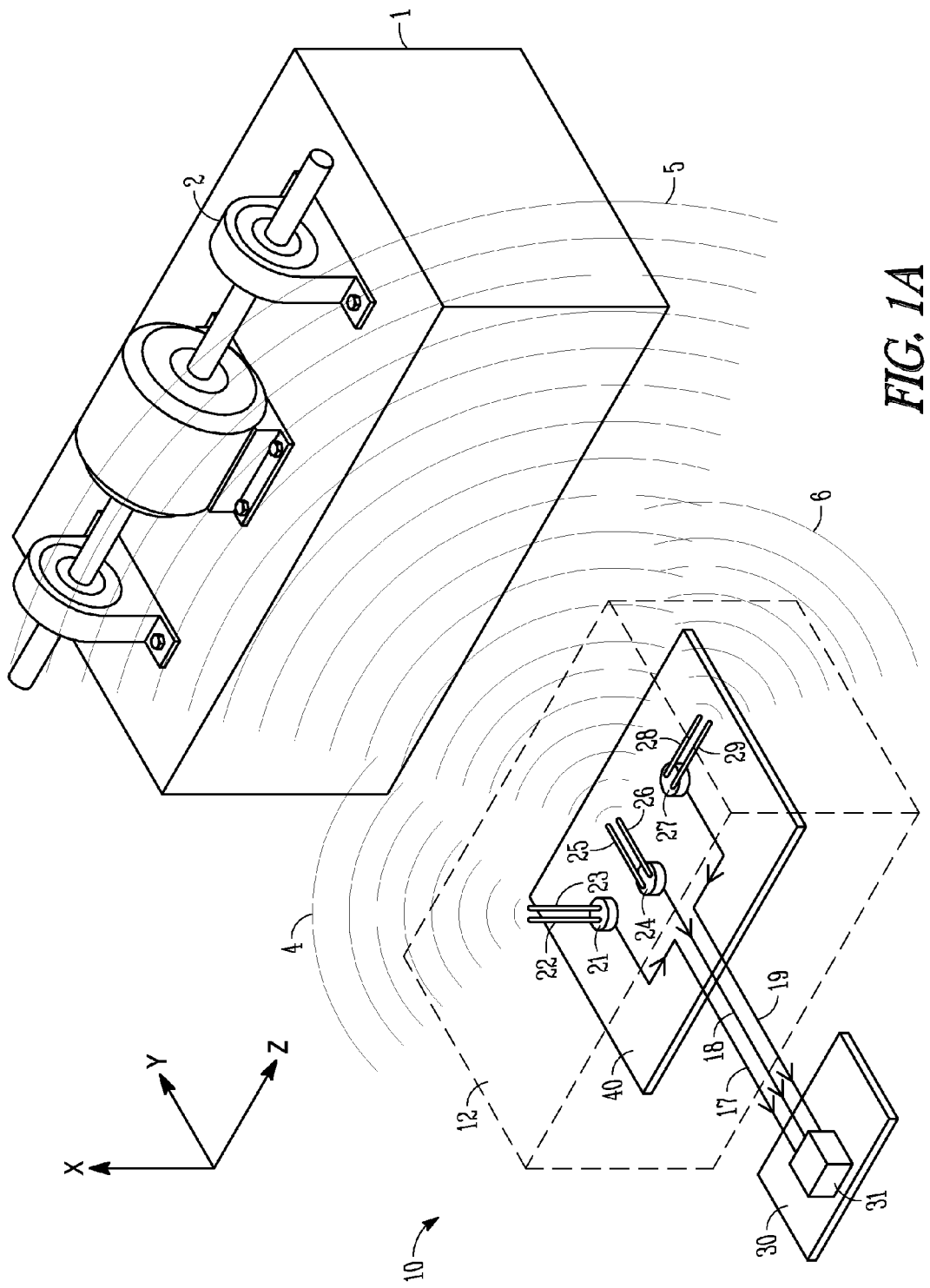
FIG. 1 shows an example non-contact motion sensor that includes a Doppler radar detector.
Figure 1B:
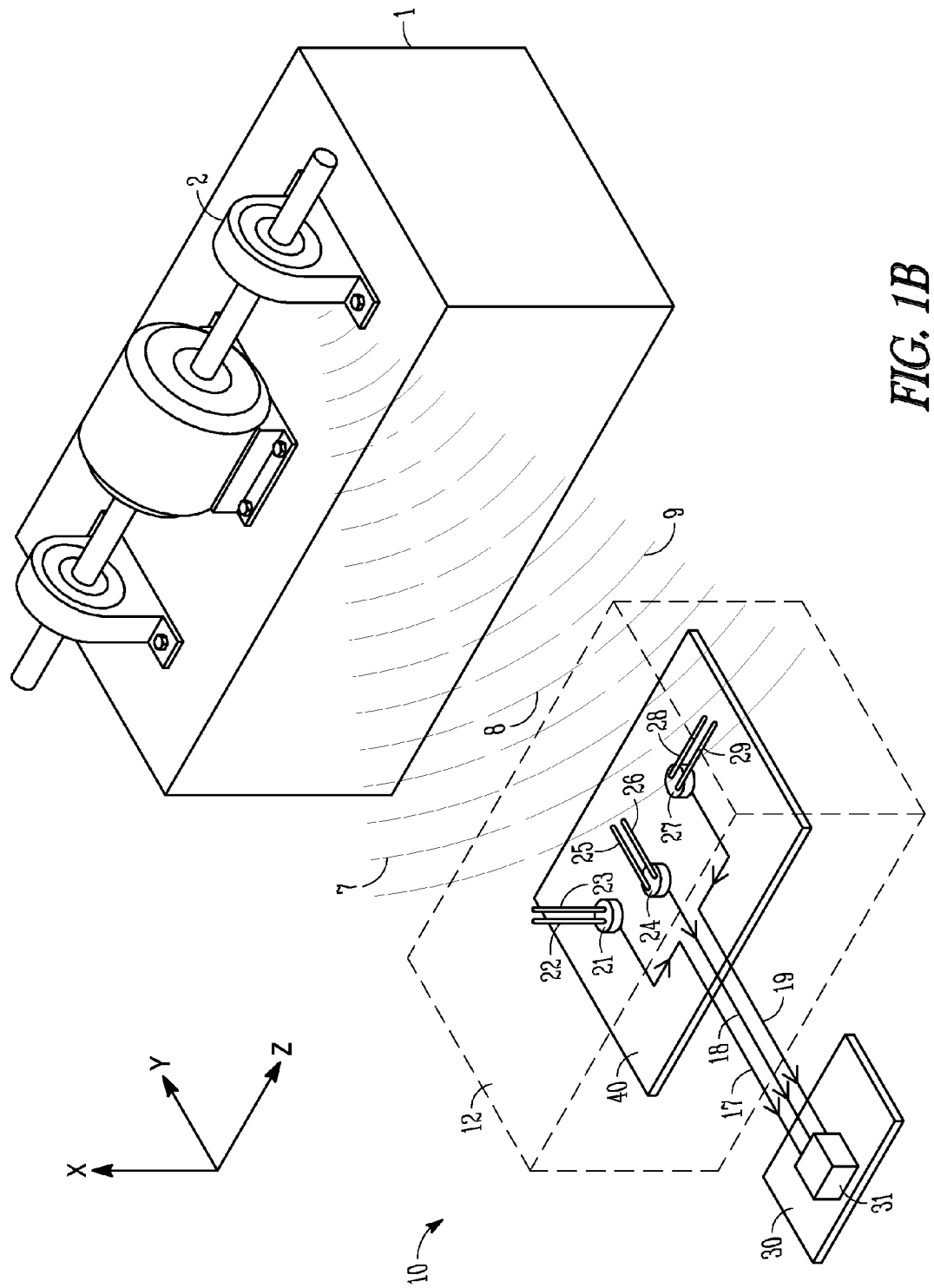

FIGS. 1A and 1B show a non-contact motion sensor 10 that includes a Doppler radar detector 12. The Doppler radar detector 12 includes a first antenna 21, a second antenna 24 that is orthogonal to the first antenna 21 and a third antenna 27 that is orthogonal to the first antenna 21 and the second antenna 24. The non-contact motion sensor 10 further includes a control 30 that collects and analyzes intermediate signals 17, 18, 19 that are received from the Doppler radar detector 12.

The intermediate signals 17, 18, 19 may be analyzed to provide information about the motion of a component 2 in three dimensions since the radar detector measures only the motion of the target along the axis perpendicular to the antenna As an example, a geometrical relationship may be established between component 2 motion and the amplitude or frequency of the intermediate signals 17, 18, 19. Using the established geometrical relationship movement of the component 2 can be projected.

In some embodiments, the first antenna 21 includes a transmitting portion 22 and a receiving portion 23, the second antenna 24 includes a transmitting portion 25 and a receiving portion 26 and the third antenna 27 includes a transmitting portion 28 and a receiving portion 29. Although all of the FIGS. show the first, second and third antennas 21, 24, 27 as being formed of a transmitting portion and a receiving portion, it should be noted that each of the first, second and third antennas 21, 24, 27 may be formed of two sub-antennas (i.e., one for transmitting and the other for receiving).

Depending on the application where the non-contact motion sensor 10 is utilized, the control 30 alternately activates the first antenna 21, the second antenna 24 and the third antenna 27 such that only one of first antenna 21, the second antenna 24 and the third antenna 27 is operating at a time. The first, second and third antennas 21, 24, 27 may be activated one at a time to avoid their interaction due to the RF energy reflection over a wide angle field of view. The Doppler radar detector 12 detects the motion of a target (i.e., a component 2 on a machine 1) only in the direction perpendicular to the respective first, second and third antennas 21, 24, 27. Thus, each of the first, second and third antennas 21, 24, 27 will measure motion in the direction perpendicular to itself and normal to the vectors of two other antennas.

Several characteristics make a microwave Doppler radar detector 12 attractive for detecting motion. The Doppler radar detector 12 may be relatively inexpensive when compared to other monitoring equipment. No contact is necessary between the Doppler radar detector 12 and the components to be monitored. One Doppler sensor could monitor wide field of view versus the existing contact sensors e.g. accelerometers that sense the vibration at the point of attachment only. In addition, the signal processing methods for Doppler radar signals are relatively simple.

In the example embodiment illustrated in FIGS. 1A and 1B, the first antenna 21, the second antenna 24 and the third antenna 27 are mounted on a common substrate 40. Although the control 30 is shown in FIGS. 1A and 1B as being separate from the Doppler radar detector 12, in some embodiments the control 30 may be mounted within the Doppler radar detector 12 (e.g., on the substrate 40).

When the mounting angles between the first, second and third antennas 21, 24, 27 and the surfaces of the component 2 are known, the three measured motion values could be converted by geometric calculations to the geometrical reference system of the component 2. Thus, the movement of the component 2 will be measured in three dimensions.

In some embodiments, determining motion of the component 2 based on the intermediate signals 17, 18, 19 may include determining displacement of the component. The output voltage of the Doppler sensor is proportional to the displacement of the target when the displacement is substantially smaller than the wavelength of the radio frequency (e.g., 10% or less). It should be noted that in other embodiments, different types of types of motion may be determined by differentiation with respect of time for the component 2. As examples, the vibration, acceleration and velocity may be determined in three dimensions for the component 2.

In some embodiments, the control 30 includes a filter 31 that manipulates the intermediate signals 17, 18, 19 for subsequent collection and analysis (e.g., by a computer). As an example, the filter 31 may remove signals unless the signals are in the 1 to 10,000 Hz range. As used herein, filtering also refers to all signal processing or signal conditioning functions/operations.

Figure 2A:
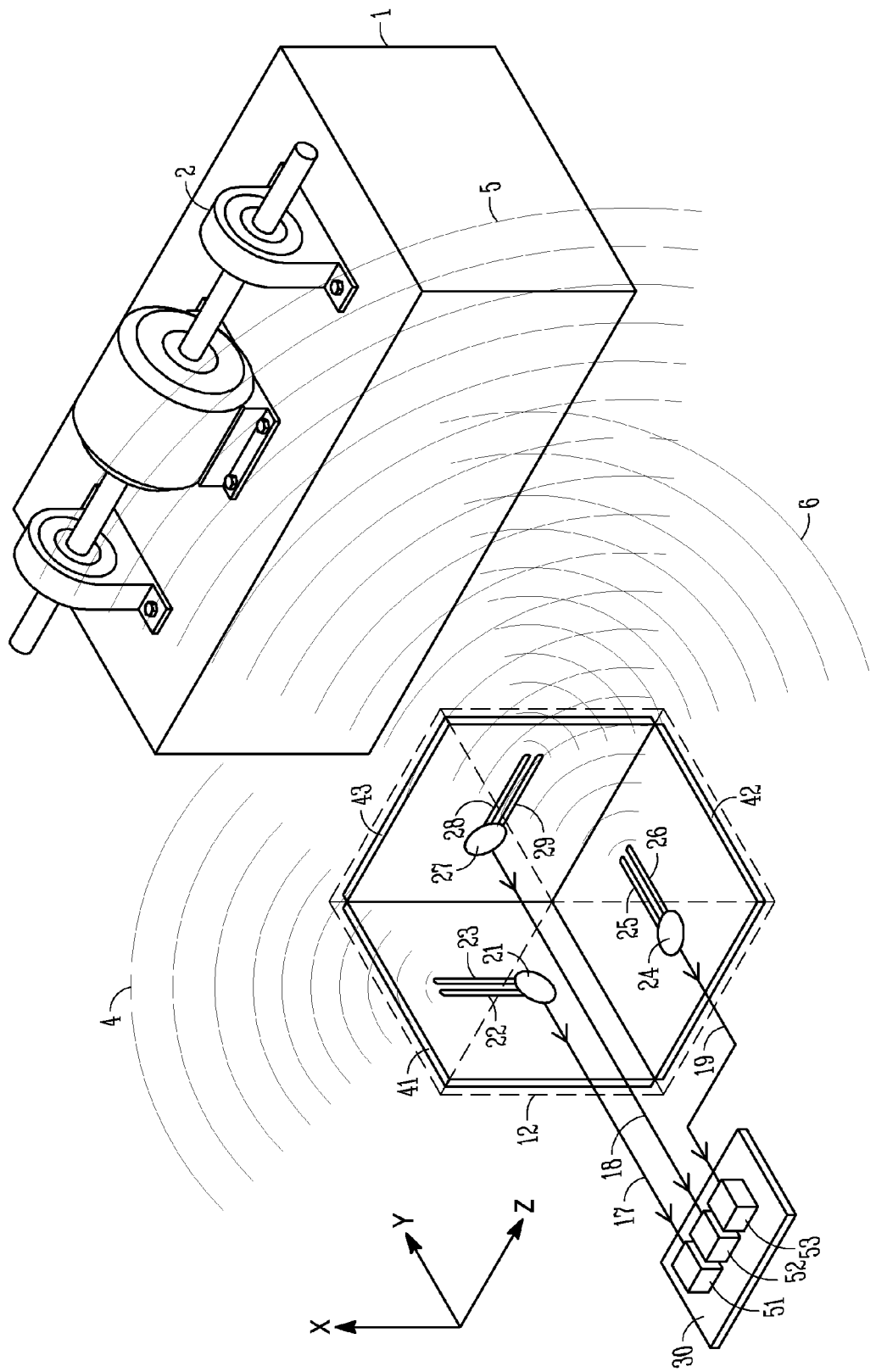
FIG. 2 shows an example non-contact motion sensor similar to FIG. 1 where the first antenna is mounted on a first substrate, the second antenna is mounted on a second substrate and the third antenna is mounted on a third substrate.
Figure 2B:
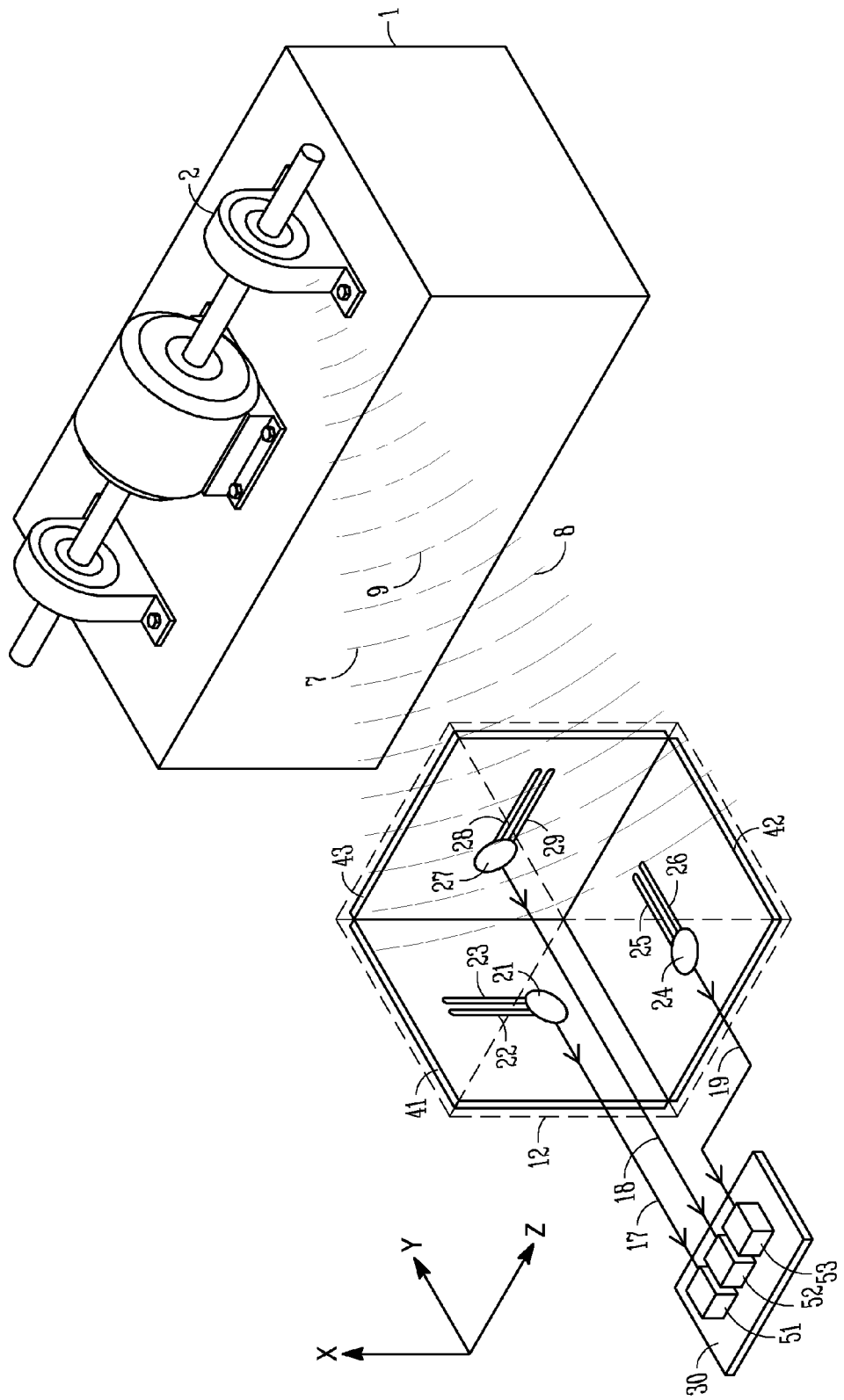

FIGS. 2A and 2B show an example embodiment where the first antenna 21 is mounted on a first substrate 41, the second antenna 24 is mounted on a second substrate 42 and the third antenna 27 is mounted on a third substrate 43. The first substrate 41 is in a first plane X while the second substrate 42 is in a second plane Y that is orthogonal to the first plane X. The third substrate 43 is in a third plane Z that is orthogonal to the first plane X and the second plane Y.

In the example embodiment illustrated in FIGS. 2A and 2B, the control 30 includes (i) a first filter 51 that manipulates the intermediate signal 17 from the first antenna 21 for subsequent collection and analysis; (ii) a second filter 52 that manipulates the intermediate signal 18 from the second antenna 24 for subsequent collection and analysis; and (iii) a third filter 53 that manipulates the intermediate signal 19 from the third antenna 27 for subsequent collection and analysis. It should be noted that some or all of the filters may be low pass, high pass and notch types as well as fast Fourier transforms that divide a signal in small intervals around particular frequencies.

In some embodiments, each of the first, second and third filters 51, 52, 53 removes signals in the same frequency range. As an example, the first, second and third filters 51, 52, 53 may remove signals unless the signals are in the 1 to 10,000 Hz range.

The first antenna 21, the second antenna 24 and the third antenna 27 may each transmit signals in a narrow beam profile. As an example, the first antenna 21 may be an array of patch antennas that transmits signals in a narrow beam profile, the second antenna 24 may be an array of patch antennas that transmits signals in a narrow beam profile and the third antenna 27 may be an array of patch antennas that transmits signals in a narrow beam profile. As another example, the first antenna 21 may be a horn antenna that transmits signals in a narrow beam profile, the second antenna 24 may be a horn antenna that transmits signals in a narrow beam profile and the third antenna 27 may be a horn antenna that transmits signals in a narrow beam profile.

In some embodiments, passive or active reflectors may be placed at a specific location on the component 2 to help define any motion at that location. Stronger signals may be reflected from the reflector(s) which can be differentiated from weaker signals at other locations.

The non-contact motion sensors 10 described above may be used in a method of detecting motion in a component 2. The method includes transmitting radio frequency signals 4 using a first antenna 21, transmitting radio frequency signals 5 using a second antenna 24 and transmitting radio frequency signals 6 using a third antenna 27. The method further includes receiving reflected radio frequency signals 7 from the component 2 with the first antenna 21, receiving reflected radio frequency signals 8 from the component 2 with the second antenna 24 that is orthogonal to the first antenna 21 and receiving reflected radio frequency signals 9 from the component 2 with the third antenna 27 that is orthogonal to the second antenna 24 and the first antenna 21. It should be noted that radio frequency signals as used herein refers to variety of different types of signals (e.g., microwave radar signals).

The method further includes generating intermediate frequency signals 17, 18, 19 based on differences between the transmitted radio frequency signals 4, 5, 6 and the respective reflected radio frequency signals 7, 8, 9 and measuring the intermediate frequency signals 17, 18, 19. The method may further include filtering the intermediate signals 17, 18, 19 to isolate signals associated with three dimensional motion of the component 2.

In some embodiments, transmitting radio frequency signals 4 using the first antenna 21 may include transmitting the radio frequency signals 4 with a transmitting portion 22 of the first antenna 21 and receiving reflected radio frequency signals 7 from the component 2 with the first antenna 21 includes receiving the reflected radio frequency signals 7 with a receiving portion 23 of the first antenna 21. In addition, transmitting radio frequency signals 5 using the second antenna 24 may include transmitting the radio frequency signals 5 with a transmitting portion 25 of the second antenna 24 and receiving reflected radio frequency signals 8 from the component 2 with the second antenna 24 may include receiving the reflected radio frequency signals 8 with a receiving portion 26 of the second antenna 24. In addition, transmitting radio frequency signals 6 using the third antenna 27 may include transmitting the radio frequency signals 6 with a transmitting portion 28 of the third antenna 27 and receiving reflected radio frequency signals 9 from the component 2 with the third antenna 27 may include receiving the reflected radio frequency signals with a receiving portion 29 of the third antenna 27.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A non-contact motion sensor comprising:
a radar detector that includes a first antenna, a second antenna that is orthogonal to the first antenna and a third antenna that is orthogonal to the first antenna and the second antenna; and
a control that collects and analyzes signals that are received from the radar detector, wherein the control alternately activates the first antenna, the second antenna and the third antenna such that only one of first antenna, the second antenna and the third antenna is operating at a time.

2. The noncontact motion sensor of claim 1 wherein the radar detector is a Doppler radar detector.

3. The non-contact motion sensor of claim 1 wherein the first antenna includes a transmitting portion and a receiving portion, the second antenna includes a transmitting portion and a receiving portion and the third antenna includes a transmitting portion and a receiving portion.

4. The non-contact motion sensor of claim 1 wherein the first antenna, the second antenna, the third antenna and the control are mounted on a common substrate.

5. The non-contact motion sensor of claim 4 wherein the control includes a filter that manipulates the received signal frequencies for subsequent collection and analysis.

6. The non-contact motion sensor of claim 5 wherein the filter includes a fast Fourier transform which splits signals in narrow bands of frequencies.

7. The non-contact motion sensor of claim 5 wherein the filter removes signals unless the signals are in the 1 to 10,000 Hz range.

8. The non-contact motion sensor of claim 1 wherein the first antenna is mounted on a first substrate, the second antenna is mounted on a second substrate and the third antenna is mounted on a third substrate.

9. The non-contact motion sensor of claim 8 wherein the control includes:
- a first filter that manipulates the received signal frequencies from the first antenna for subsequent collection and analysis;
- a second filter that manipulates the received signal frequencies from the second antenna for subsequent collection and analysis; and
- a third filter that manipulates the received signal frequencies from the third antenna for subsequent collection and analysis.

10. The non-contact motion sensor of claim 9 wherein the first filter is mounted on the first substrate, the second filter is mounted on the second substrate and the third filter is mounted on the third substrate.

11. The non-contact motion sensor of claim 8 wherein the first substrate is in a first plane, the second substrate is in a second plane that is orthogonal to the first plane and the third substrate is in a third plane that is orthogonal to the first plane and the second plane.

12. The non-contact motion sensor of claim 1 wherein the first antenna, the second antenna and the third antenna each transmit signals in a narrow beam profile.

13. The non-contact motion sensor of claim 1 wherein the first antenna is an array of patch antennas that transmits signals in a narrow beam profile, the second antenna is an array of patch antennas that transmits signals in a narrow beam profile and the third antenna is an array of patch antennas that transmits signals in a narrow beam profile.

14. The non-contact motion sensor of claim 1 wherein the first antenna is a horn antennas that transmits signals in a narrow beam profile, the second antenna is a horn antenna that transmits signals in a narrow beam profile and the third antenna is a horn antenna that transmits signals in a narrow beam profile.

15. A method of detecting motion in a component, the method comprising:
- transmitting radio frequency signals using a first antenna,
- transmitting radio frequency signals using a second antenna;
- transmitting radio frequency signals using a third antenna;
- receiving reflected radio frequency signals from the component with a first antenna;
- receiving reflected radio frequency signals from the component with a second antenna that is orthogonal to the first antenna;
- receiving reflected radio frequency signals from the component with a third antenna that is orthogonal to the second antenna and the first antenna;
- generating intermediate frequency signals based on differences between the transmitted radio frequency signals and the reflected radio frequency signals;
- measuring the intermediate frequency signal; and
- wherein transmitting the radio frequency signal using the first antenna, transmitting the radio frequency signal using the second antenna and transmitting the radio frequency signal using the third antenna are done at different times.

16. The method of claim 15 further comprising filtering the intermediate signals to isolate signals associated with motion of the component.

17. The method of claim 15 wherein transmitting radio frequency signals using the first antenna includes transmitting the radio frequency signals with a transmitting portion of the first antenna and receiving reflected radio frequency signals from the component with the first antenna includes receiving the radio frequency signals with a receiving portion of the first antenna, and wherein transmitting radio frequency signals using the second antenna includes transmitting the radio frequency signals with a transmitting portion of the second antenna and receiving reflected radio frequency signals from the component with the second antenna includes receiving the radio frequency signals with a receiving portion of the second antenna, and wherein transmitting radio frequency signals using the third antenna includes transmitting the radio frequency signals with a transmitting portion of the third antenna and receiving reflected radio frequency signals from the component with the third antenna includes receiving the radio frequency signals with a receiving portion of the third antenna.

18. The method of claim 15 wherein the component is mounted on a machine such that receiving reflected radio frequency signals from the component with a first antenna includes placing an RF reflector on the machine so reflection of signals from the component is localized and not obstructed by other parts of the machine; and wherein receiving reflected radio frequency signals from the component with a second antenna that is orthogonal to the first antenna includes placing an RF reflector on the machine so reflection of signals from the component is localized and not obstructed by other parts of the machine; and wherein receiving reflected radio frequency signals from the component with a third antenna that is orthogonal to the second antenna and the first antenna strong RF reflector is placed includes placing an RF reflector on the machine so reflection of signals from the component is localized and not obstructed by other parts of the machine.

* * * * *